(12) United States Patent
Weiser et al.

(10) Patent No.: US 7,231,702 B2
(45) Date of Patent: Jun. 19, 2007

(54) CONNECTOR AND METHOD OF USE THEREOF

(75) Inventors: Isaac Weiser, Tarzana, CA (US); Margaret Weiser, Tarzana, CA (US)

(73) Assignee: Exhart Environmental Systems, Inc., Chatsworth, CA (US)

( * ) Notice: Subject to any disclaimer, the term of this patent is extended or adjusted under 35 U.S.C. 154(b) by 0 days.

(21) Appl. No.: 11/007,958

(22) Filed: Dec. 8, 2004

(65) Prior Publication Data

US 2005/0105962 A1    May 19, 2005

Related U.S. Application Data

(62) Division of application No. 10/612,094, filed on Jul. 1, 2003.

(51) Int. Cl.
*A01M 31/06* (2006.01)

(52) U.S. Cl. .................. 29/436; 403/265; 403/270; 403/271; 29/447; 29/450; 29/453; 29/890.13; 29/DIG. 24; 267/178; 267/179; 267/180

(58) Field of Classification Search .............. 403/193, 403/265, 266, 270, 271, 272, 274, 242; 411/508, 411/510; 43/3; 29/890.13, DIG. 24, 436, 29/447, 450, 453; 248/623, 624; 267/178–180
See application file for complete search history.

(56) References Cited

U.S. PATENT DOCUMENTS

| | | | | |
|---|---|---|---|---|
| 2,254,566 A | * | 9/1941 | Cornell, Jr. ............... 403/229 |
| 2,879,960 A | * | 3/1959 | Mortimer ................. 248/624 |
| 2,942,370 A | * | 6/1960 | Zaruba ......................... 43/3 |
| 3,029,486 A | | 4/1962 | Raymond |
| 3,230,592 A | | 1/1966 | Hosea |
| 3,435,550 A | | 4/1969 | Carlson |
| 3,461,545 A | * | 8/1969 | Bush ....................... 403/270 |
| 3,582,603 A | * | 6/1971 | Hinden ..................... 29/432 |
| 3,631,585 A | * | 1/1972 | Stamm ..................... 403/270 |
| 3,909,883 A | | 10/1975 | Fegen ........................ 24/73 |
| 4,130,751 A | * | 12/1978 | Gordon .................... 403/270 |
| 4,380,847 A | * | 4/1983 | Tajima ..................... 403/229 |
| 4,636,109 A | * | 1/1987 | Clausen et al. ............ 248/156 |
| 4,787,795 A | | 11/1988 | Kraus ....................... 411/510 |
| 5,046,223 A | | 9/1991 | Kraus ....................... 24/453 |
| D324,168 S | | 2/1992 | Fujioka ..................... D8/354 |
| 5,105,682 A | * | 4/1992 | Jung ....................... 74/502.4 |
| 5,137,013 A | * | 8/1992 | Chiba et al. ............... 604/524 |
| 5,375,363 A | * | 12/1994 | Higdon ........................ 43/3 |
| 5,393,164 A | * | 2/1995 | Renner et al. ............ 403/270 |
| 5,499,947 A | * | 3/1996 | Tauber ................... 29/890.124 |
| 5,613,317 A | * | 3/1997 | Ninegar ....................... 43/3 |
| 5,666,988 A | * | 9/1997 | Becker ..................... 403/242 |
| 5,672,038 A | | 9/1997 | Eaton ....................... 411/510 |
| 5,851,097 A | | 12/1998 | Shereyk et al. ........... 411/508 |
| 6,095,595 A | | 8/2000 | Galbraith .................. 296/208 |
| 6,129,606 A | * | 10/2000 | Yuen ....................... 446/325 |
| 6,293,042 B1 | | 9/2001 | Arvanitis, Jr. et al. ......... 43/3 |
| 6,698,132 B1 | * | 3/2004 | Brint ........................... 43/3 |
| 6,773,768 B2 | * | 8/2004 | Weiser ......................... 43/3 |
| 6,843,702 B2 | * | 1/2005 | Weiser ......................... 43/3 |

* cited by examiner

*Primary Examiner*—Daniel P. Stodola
*Assistant Examiner*—Ernesto Garcia
(74) *Attorney, Agent, or Firm*—Cislo & Thomas LLP

(57) ABSTRACT

A connecting structure is provided. The structure includes a post with a first end, middle portion, and a second end, a plurality of prongs flexibly connected to the first end, extending toward the second end in a V-shape.

14 Claims, 2 Drawing Sheets

CONNECTOR AND METHOD OF USE THEREOF

CROSS-REFERENCES TO RELATED APPLICATIONS

This patent application is a divisional application of U.S. patent application Ser. No. 10/612,094 filed Jul. 1, 2003 for PLASTIC CONNECTOR FOR CONNECTING PARTS AND METHOD THEREFOR, which application is incorporated herein by this reference thereto.

BACKGROUND OF THE INVENTION

1. Field of the Invention

This invention relates generally to connectors and more specifically to connectors for moveable, wing-like appendages for novelty items and for methods of using them. Assembled objects such as birds having extending wings are difficult to ship because of the amount of room they take, in assembled form, in shipping cartons. Because so many objects are now manufactured abroad, it is desirable to have as compact shipping as possible. Therefore, it becomes desirable to be able to ship articles in an unassembled state yet still allow easy assembly of the article, for example a bird novelty with extending wings once delivered to the vendor.

2. Description of the Related Art

Generally winged, push-through type connectors are well known in the art. They are used for applications from seating circuit boards to securing light fixtures to a ceiling. The prior art connectors are rigid and typically fasten nonmoveable objects together. In contradistinction, applicants' invention is intended to couple a moveable object in an unassembled state in secure assembled fashion.

SUMMARY OF THE INVENTION

The present invention comprises a connecting structure including a post with a first end, middle portion, and a second end, a plurality of prongs flexibly connected to the first end, extending toward the second end in a V-shape such that when inserted through a hole or bore of an object allows for easy assembly therewith in secure fashion.

DESCRIPTION OF THE PREFERRED EMBODIMENT(S)

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention as set forth in the independent claims.

Figure 1:
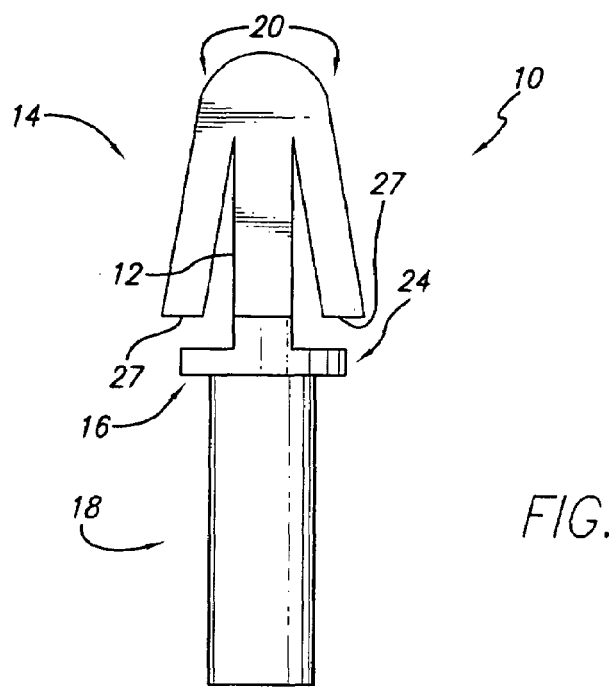
FIG. 1 is a side view of the connecting structure according to the present invention.
Figure 4:
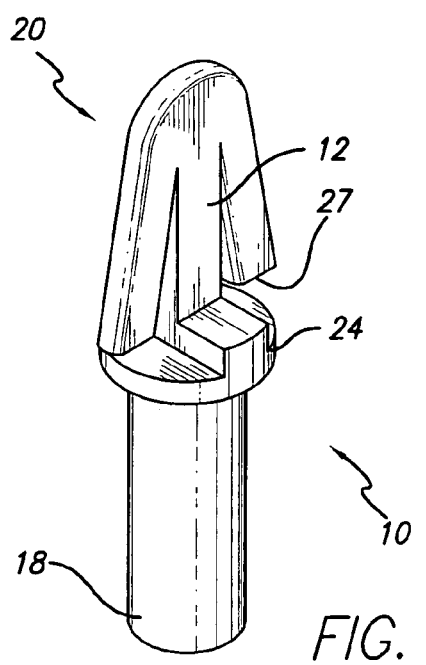
FIG. 4 is a perspective view of the connecting structure.

A connecting structure according to one embodiment of the present invention is shown in FIGS. 1 and 4 generally at 10. Connecting structure 10 typically includes a cylindrical post 12, which has a first end 14, a middle portion 16, and a second end 18. Furthermore, connecting structure 10 typically includes outwardly flared prongs 20 which are flexibly coupled to post 12 and which extend away from the first end 14 of post portion 12. Prongs 20 typically extend away from first end 14 toward second end 18 in an inverted (as shown) V-shaped manner. Typically, connecting structure 10 includes two or more prongs 20 that fit through an aperture to secure connecting structure 10 to the object having the aperture.

Post 12 is typically cylindrical, molded plastic 0.5–0.75 inches in length, and 0.05–0.1 inches in diameter. However, it will be appreciated that other materials, configurations and dimensions can be used, as desired.

Figure 2:
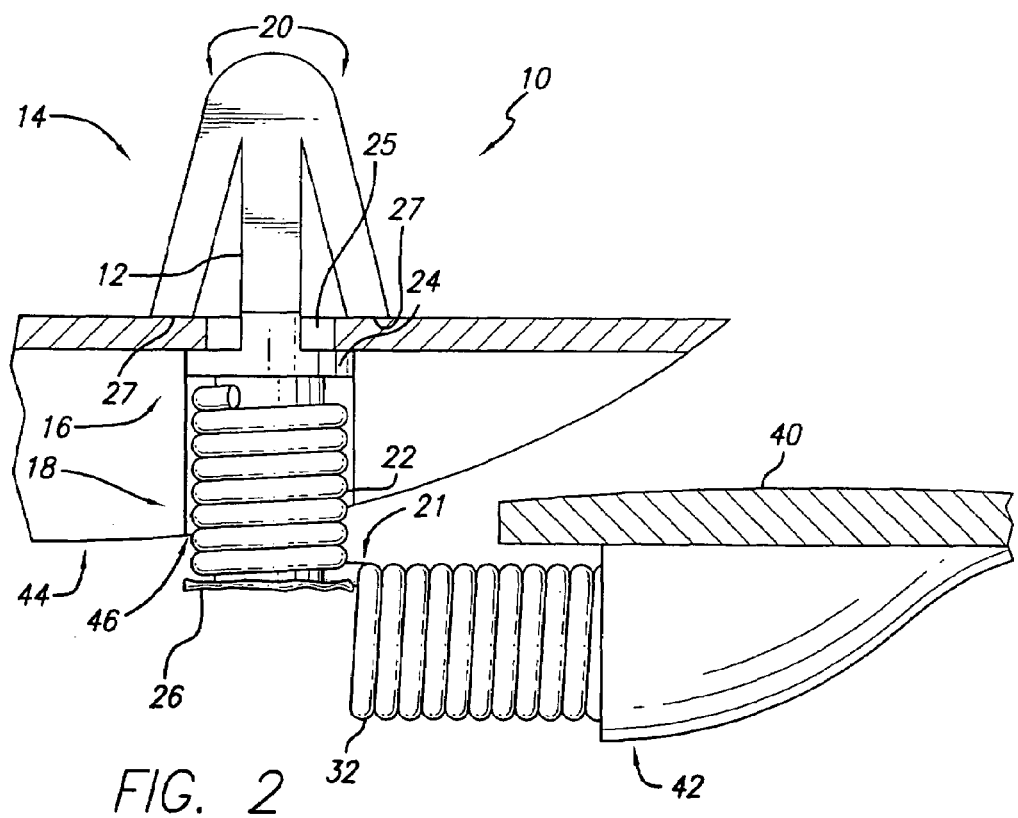
FIG. 2 is a partial cross-sectional view of a novelty with an aperture utilizing the connecting structure according to the present invention.

Prongs 20 are typically integrally formed as a portion of post 12, but may be flexibly coupled in any other manner that allows prongs 20 to extend through an aperture and then expand to wider than the aperture to secure connecting structure 10 to the object with the aperture by reason of the abutment or collar stop 24 and the termini of prongs 20 as best seen in FIG. 2. Connecting structure 10 is typically made of molded plastic, but may be made from any other material that allows prongs 20 to flex.

FIG. 2 depicts connecting structure 10 including prongs 20, abutment or collar stop 24 being disposed in aperture 25 and held in place by reason of cooperative relationship of abutment or collar stop 24 and the termini 27 of prongs 20. In this instance the second end 18 of post 12 is inserted in secure relationship with connecting member portion 22 which is integrally connected to portion 32 of connecting member 21. Connecting member 21 is depicted as a coil spring with portions 22 and 32 being at right angles to one another.

Connecting member portion 22 typically encircles the second end 18 of post 12 extending toward middle portion 16, such that an object such as a wing connected to connecting member 21 may move with respect to post portion 12.

Connecting structure 10 has post 12 typically formed as shown in FIGS. 1 and 4 which is then inserted into connecting member 21, with abutment or collar stop 24 forming a stop as previously described. The second end 18 of post 12 is configured to extend a small distance through connecting member portion 22 of connecting member 21. A hot rod or the like is then applied to the protruding termini of second end 18 to melt the end thereof to form barrier 26, such that connecting member portion 22 cannot be removed from end 18 of post 12. It will be appreciated that this securement may be accomplished in other ways, including molding post 12 in association with connecting member portion 22 of connecting member 21.

Abutment stop or collar 24 is typically configured to also delineate where connecting member portion 22 may extend to. Abutment stop or collar 24 is also configured to be adjacently positioned to an object having an aperture so that prongs 20 fit through the aperture as previously described. Abutment stop or collar 24 typically extends away from post 12 a distance greater than that of connecting member portion 22, but not as far as the termini 27 of prongs 20. Heat fusion stop 25 is typically formed to extend away from post 12 a distance that does not allow connecting member portion 22 to slide off of post 12, but may extend other distances.

In the embodiment depicted, connecting structure 10 is intended to couple generally "L"-shaped connecting member 21 having portions 22 and 32. Connecting member 21, in this embodiment, has connecting member portion 22 encircling second end 18 of post 12 extending toward middle portion 16, ending at abutment stop or collar 24. Connecting member 21 is typically an "L"-shaped coil spring, but may be configured otherwise. In this instance the "L" shape better simulates the movement of a bird's wing, but other configurations may be used. Connecting member 21 is typically 0.2–0.5 inches long, and 0.1–0.25 inches for each portion of the "L" shape, however other dimensions can be used as desired.

Figure 3:
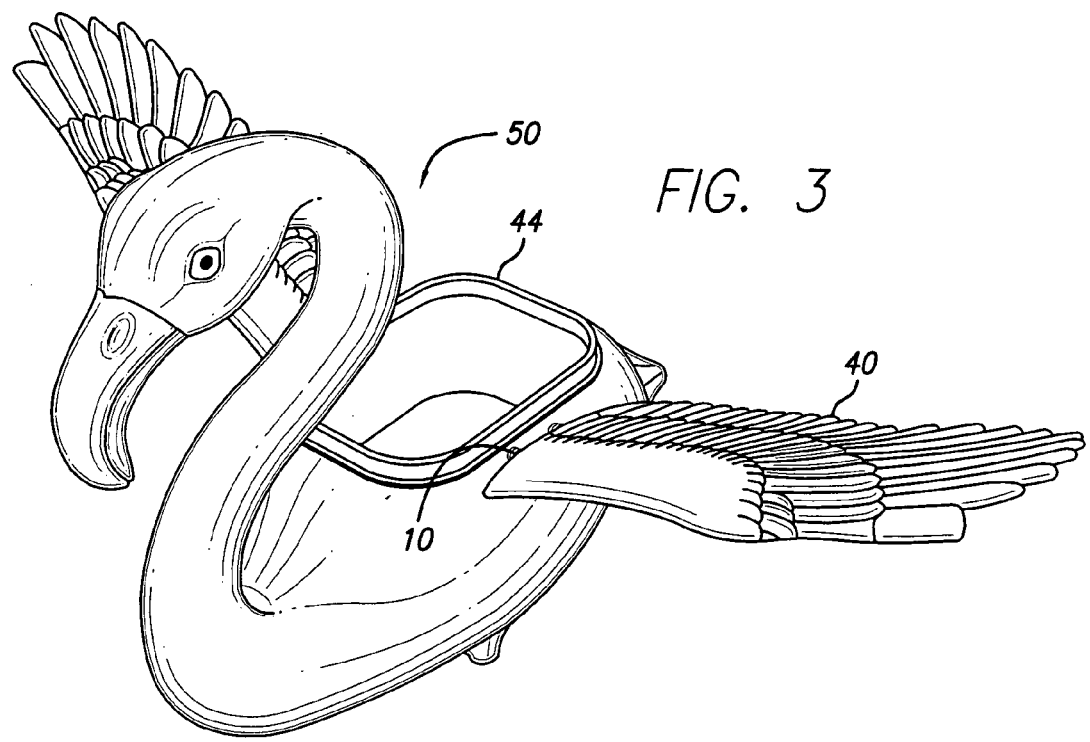
FIG. 3 is a perspective view of a novelty utilizing the present invention.

As seen in FIGS. 2 and 3 it is desired to connect wings of a bird, for example, to the body after unassembled shipment. The connector 10 is shipped in secured relationship with the wing or appendage 40. The wing or appendage is then assembled to the body 44 by inserting the connector 10 with attached wing or appendage 40 to the body 44 as previously described. To achieve realistic form the connector 21 has portion 22 at right angles to portion 32 as the weight of the wing or appendage will cause drooping or bending of the spring connector 21. As shown in FIG. 2, body 44 typically includes apertures 25 and 46 and is configured to receive connecting structure 10 such that connecting structure 10 slides through apertures 25 and 46 and prongs 20 expand on the other side of body 44 to secure connecting structure 10 and wing or appendage 40 to body 44. Prongs 20 flex inward or toward post 12 to allow connecting structure 10 to pass through apertures 25 and 46. Prongs 20 then expand and return to the unflexed position to secure connecting structure 10 with the secured wing or appendage 40 to body 44. With this configuration, connecting structure 10 will connect to body 44 and to appendage 40, such that appendage 40 will be springly moveable with respect to post 12 and body 44 due to connecting member 21. Connecting member 21 here depicted as a coil spring in configuration may be configured to flex with relatively small forces acting upon it.

Body 44 is typically a bird, but other novelty designs may be used, as desired. Body 44 is typically 10.0–20.0 inches long by 4.0–10 inches wide, by 10.0–20.0 inches high. It will be appreciated that other dimensions and designs for body 44 may be used, as desired whether as planters or bird feeders.

Connecting member 21 may be configured with a spring constant such that wing or appendage 40 will move with relatively low forces acting upon it. Low forces may include a summer breeze or other small force, either natural or man-made. To disassociate wing or appendage 40 from body 44, prongs 20 are pressed together toward post 12 and connecting structure 10 may be removed from apertures 25 and 46.

Wing or appendage 40 typically has an enclosure 42 that is configured to connect to connecting member 21 via connecting member portion 32. Enclosure 42 is typically an enlarged portion of appendage 40 that is molded around connecting member portion 32 to connect to it, but other methods of coupling connecting member 21 and appendage 40 may be utilized. Appendage 40 may be in the shape of a wing, and is typically 5.0–15.0 inches in length and 2.0–8.0 inches wide.

FIG. 3 is a perspective view of a novelty depicting a bird and employing the connecting structure 10 of the present invention. Novelty 50 includes body 44 and appendage 40, and connecting structure 10 configured to connect body 44 to appendage 40. With this configuration, appendage 40 may move and simulate the wing movement of a bird, insect, or the like. Appendage 40 is typically shaped like a wing, but may be shaped like other appendages including arms or legs of a Halloween character, or the like. Body portion 44 may be configured to form a flowerpot, but also may be in the form of other novelties.

Both body 44 and appendage 40 are typically made of molded plastic, but may be made of other materials, including painted ceramic. Novelty 50 may be configured such that connecting structure 10 and appendage 40 may be disassociated from body 44 such that appendages 40 may be removed from body portion 44. This configuration allows all parts of novelty 50 to fit into a smaller package than when in the assembled form. Therefore, novelty 50 may then be packaged, shipped and stored in a smaller package, thus saving shipping costs and valuable shelf space in a retail store.

In an exemplary embodiment, body 44 is approximately 13.5 by 6.5 by 14.0 inches, appendage 40 is approximately 4.5 by 10.0 inches, post 12 is approximately 0.625 inches long and 0.0625 inches in diameter, prongs 20 are approximately 0.25 inches long, and connecting member portion 22 is 0.25 inches and 0.50 inches in a generally "L"-shaped configuration.

While the present invention has been described with regards to particular embodiments, it is recognized that additional variations of the present invention may be devised without departing from the inventive concept.

What is claimed is:

1. A method of fabricating a connecting structure, comprising:
   providing a post with a first end, a middle portion, a second end, and a plurality of securing prongs extending elastically therefrom to terminate at respective free ends;
   providing a coil spring for facilitating displaceable suspension of an appendage in relation to a novelty item body, the coil spring providing step further comprising forming the coil spring in an L-shaped configuration;
   inserting said second end of said post coaxially into a first end of the coil spring; and
   deforming said post by heating for retentively coupling said post to said coil spring, the deforming step comprising heating the second end of the post by using a hot rod for creating a barrier such that the coil spring is stopped against its removal from said post.

2. The method of claim 1,
   wherein the post providing step further comprises configuring the plurality of securing prongs to extend through an aperture and expand to a width larger than the aperture, and
   wherein the configuring step comprises subtending the plurality of prongs with the post to form an acute angle.

3. The method of claim 1, wherein the post providing step further comprises:
   outwardly flaring the plurality of securing prongs; and
   forming a generally V-shape configuration in an inverted V-shape.

4. The method of claim 1, wherein the coil spring providing step further comprises providing the coil spring having a spring constant in a range such that the appendage moves by a small incident force and springs back into its original position.

5. The method of claim 1, wherein the post providing step further comprises:
   providing the post having a cylindrical cross-section, providing the post having a length in a range of 0.5 inch to 0.75 inch; and providing the post having a diameter in a range of approximately 0.05 inch to approximately 0.1 inch.

6. The method of claim 1, wherein the post providing step further comprises:

forming the post from a molded plastic; and forming the plurality of securing prongs from a molded plastic.

7. The method of claim 6, wherein the coil spring providing step further comprises simulating the movement of a bird's wing, wherein the right coil spring providing step comprises facilitating at least one movement selected from a group consisting of drooping and bending for achieving a realistic form, and wherein the coil spring providing step further comprises springingly moving the appendage with respect to the post and the body.

8. The method of claim 1, wherein the coil spring providing step further comprises providing a length in a range of 0.2 inch to 0.5 inch, and wherein the coil spring providing step further comprises providing each coil spring portion with a length of 0.1 inch to 0.25 inch.

9. A method of using a connecting structure, comprising the steps of:

providing a post with a first end, a middle portion, and a second end; and providing a plurality of prongs being flexibly connected to the first end and extending away from the post and toward the second end in a generally V-shape configuration and toward an abutment stop intermediate the first end and the second end;

providing a coil spring for facilitating displaceable suspension of an appendage in relation to a body, the coil spring providing step further comprising forming the coil spring in an L-shaped configuration;

inserting the post coaxially into a first end of the coil spring;

deforming the post by heating for retentively coupling the post with the coil spring, the deforming step comprising heating the second end of the post by using a hot rod for creating a barrier such that the coil spring is stopped against its removal from the post;

coupling a second end of the coil spring with the appendage; and coupling the plurality of prongs with the body, thereby coupling the appendage to the body in a displaceably suspended manner.

10. The method of claim 9, further comprising the step of providing an appendage as a bird wing.

11. The method of claim 9, further comprising the step of providing a body as a bird body.

12. The method of claim 10, wherein the appendage providing step comprises providing the appendage having a length in a range of 5 inches to 15 inches, and wherein the appendage providing step comprises providing the appendage having a width in a range of 2 inches to 8 inches.

13. The method of claim 11, wherein the body providing step comprises providing the bird body having a length in a range of 10 inches to 20 inches, wherein the body providing step comprises providing the bird body having a width in a range of 4 inches to 10 inches, and wherein the body providing step comprises providing the bird body having a height in a range of 10 inches to 20 inches.

14. A method of using a connecting structure, comprising the steps of:

providing an appendage;

providing a body;

providing a post with a first end, a middle portion, and a second end;

providing a plurality of prongs being flexibly connected to the first end and extending away from the post and toward the second end in a generally V-shape configuration and toward an abutment stop intermediate the first end and the second end;

providing a coil spring for facilitating displaceable suspension of the appendage in relation to the body, the coil spring providing step comprising forming the coil spring in an L-shaped configuration;

inserting the post coaxially into a first end of the coil spring;

deforming the post by heating for retentively coupling the post with the coil spring, the deforming step comprising heating the second end of the post by using a hot rod for creating a barrier such that the coil spring is stopped against its removal from the post;

coupling a second end of the coil spring with the appendage; and coupling the plurality of prongs with the body, thereby coupling the appendage to the body in a displaceably suspended manner, wherein the appendage providing step comprises providing the appendage having a length in a range of 5 inches to 15 inches, wherein the appendage providing step comprises providing the appendage having a width in a range of 2 inches to 8 inches, wherein the body providing step comprises providing the body having a length in a range of 10 inches to 20 inches, wherein the body providing step comprises providing the body having a width in a range of 4 inches to 10 inches, and wherein the body providing step comprises providing the body having a height in a range of 10 inches to 20 inches.

* * * * *